US010529197B2

(12) United States Patent
Lacroix et al.

(10) Patent No.: US 10,529,197 B2
(45) Date of Patent: *Jan. 7, 2020

(54) OFFLINE HAPTIC CONVERSION SYSTEM

(71) Applicant: Immersion Corporation, San Jose, CA (US)

(72) Inventors: Robert Lacroix, Saint-Lambert (CA); Satvir Singh Bhatia, Milpitas, CA (US); Jean-Francois Blanchard-Dionne, Outremont (CA); Stephen D. Rank, San Jose, CA (US); Christopher J. Ullrich, Ventura, CA (US); Loc Tien Phan, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,279

(22) Filed: Mar. 15, 2018

(65) Prior Publication Data
US 2018/0268667 A1 Sep. 20, 2018

Related U.S. Application Data

(63) Continuation of application No. 14/246,817, filed on Apr. 7, 2014, now Pat. No. 9,997,032.
(Continued)

(51) Int. Cl.
G08B 6/00 (2006.01)
G06F 3/16 (2006.01)
(Continued)

(52) U.S. Cl.
CPC ............... G08B 6/00 (2013.01); G06F 3/016 (2013.01); G06F 3/165 (2013.01); H04N 21/47217 (2013.01)

(58) Field of Classification Search
CPC combination set(s) only.
See application file for complete search history.

(56) References Cited

U.S. PATENT DOCUMENTS 5,684,722 A   11/1997 Thorner et al.
7,979,146 B2   7/2011 Ullrich et al.
(Continued)

FOREIGN PATENT DOCUMENTS

JP   2009533714 A   9/2009
JP   2011501575 A   1/2011
(Continued)

OTHER PUBLICATIONS

Wikipedia, "Transcoding—Wikipedia, the free encyclopedia", http://en.wikipedia.org/w/index.php?title=Transcoding&oldid=540873849, last downloaded on Aug. 15, 2014.
(Continued)

Primary Examiner — Nabil H Syed
Assistant Examiner — Cal J Eustaquio
(74) Attorney, Agent, or Firm — Kilpatrick Townsend & Stockton LLP

(57) ABSTRACT

A system is provided that controls an offline haptic conversion. The system receives an input from a source. The system further converts the input into haptic signals. The system further encodes the haptic signals. The system further stores the haptic signals within the source, where haptic signals are combined with the input within the source. Alternately, rather than encoding the haptic signals and storing the haptic signals within the source, the system handles the haptic signals separately, independent of the source.

18 Claims, 12 Drawing Sheets

Related U.S. Application Data

(60) Provisional application No. 61/810,196, filed on Apr. 9, 2013, provisional application No. 61/827,341, filed on May 24, 2013.

(51) Int. Cl.
*G06F 3/01* (2006.01)
*H04N 21/472* (2011.01)

(56) References Cited

U.S. PATENT DOCUMENTS

| | | | |
|---|---|---|---|
| 8,000,825 | B2 | 8/2011 | Ullrich et al. |
| 8,378,964 | B2 | 2/2013 | Ullrich et al. |
| 8,754,757 | B1 | 6/2014 | Ullrich et al. |
| 8,754,758 | B1 | 6/2014 | Ullrich et al. |
| 8,860,563 | B2 | 10/2014 | Cruz-Hernandez et al. |
| 9,092,059 | B2 | 7/2015 | Bhatia |
| 9,158,379 | B2 | 10/2015 | Cruz-Hernandez et al. |
| 9,245,429 | B2 | 1/2016 | Cruz-Hernandez et al. |
| 9,368,005 | B2 | 6/2016 | Cruz-Hernandez et al. |
| 9,443,401 | B2 | 9/2016 | Weddle et al. |
| 9,715,276 | B2 | 7/2017 | Da Costa et al. |
| 9,898,085 | B2 | 2/2018 | Saboune et al. |
| 10,055,950 | B2 | 8/2018 | Bhatia et al. |
| 10,088,903 | B2 | 10/2018 | Ullrich et al. |
| 2007/0236449 | A1 | 10/2007 | Lacroix et al. |
| 2007/0242040 | A1 | 10/2007 | Ullrich et al. |
| 2008/0294984 | A1 | 11/2008 | Ramsay et al. |
| 2009/0096632 | A1 | 4/2009 | Ullrich et al. |
| 2010/0066512 | A1 | 3/2010 | Rank |
| 2011/0202155 | A1 | 8/2011 | Ullrich et al. |
| 2011/0215913 | A1 | 9/2011 | Ullrich et al. |
| 2012/0206246 | A1 | 8/2012 | Cruz-Hernandez et al. |
| 2012/0206247 | A1 | 8/2012 | Bhatia et al. |
| 2012/0306631 | A1 | 12/2012 | Hughes |
| 2013/0131851 | A1 | 5/2013 | Ullrich et al. |
| 2013/0207917 | A1 | 8/2013 | Cruz-Hernandez et al. |
| 2014/0176415 | A1 | 6/2014 | Buuck et al. |
| 2015/0070261 | A1 | 3/2015 | Saboune et al. |

FOREIGN PATENT DOCUMENTS

| | | |
|---|---|---|
| JP | 2012168947 A | 9/2012 |
| WO | 2006019389 A2 | 2/2006 |
| WO | 2008108573 A1 | 9/2008 |

OTHER PUBLICATIONS

Any copies of informaiton that are not included with this Information Disclosure Statement can be found in U.S. Appl. No. 14/246,817.

OFFLINE HAPTIC CONVERSION SYSTEM

CROSS-REFERENCE TO RELATED APPLICATIONS

This application is a continuation of U.S. patent application Ser. No. 14/246,817 filed on Apr. 7, 2014 which issued as U.S. Pat. No. 9,997,032 on Jun. 12, 2018 (the disclosure of which is hereby incorporated by reference) which claims priority of U.S. Provisional Patent Application Ser. No. 61/810,196, filed on Apr. 9, 2013 (the disclosure of which is hereby incorporated by reference), and also claims priority of U.S. Provisional Patent Application Ser. No. 61/827,341, filed on May 24, 2013 (the disclosure of which is hereby incorporated by reference.

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with the output of other content, such as audio, so that the haptic effects are incorporated into the other content. For example, an audio effect developer can develop audio effects that can be output by the device, such as machine gun fire, explosions, or car crashes. Further, other types of content, such as video effects, can be developed and subsequently output by the device. A haptic effect developer can subsequently author a haptic effect for the device, and the device can be configured to output the haptic effect along with the other content. However, such a process generally requires the individual judgment of the haptic effect developer to author a haptic effect that correctly compliments the audio effect, or other type of content. A poorly-authored haptic effect that does not compliment the audio effect, or other type of content, can produce an overall dissonant effect where the haptic effect does not "mesh" with the audio effect or other content. This type of user experience is generally not desired.

SUMMARY

One embodiment is a system that controls an offline haptic conversion. The system receives an input from a source. The system further converts the input into haptic signals. The system further encodes the haptic signals. The system further stores the haptic signals within the source, where the haptic signals are combined with the input within the source. In an alternate embodiment, rather than encoding the haptic signals and storing the haptic signals within the source, the system handles the haptic signals separately, independent of the source.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a system that can perform an "offline" conversion of an input, such as an audio signal, video signal, or multimedia signal, into a haptic signal, where the haptic signal can cause a haptic output device, such as an actuator, to output one or more haptic effects. In performing the haptic conversion "offline," the system can perform the haptic conversion before a playback of the input, as opposed to performing the haptic conversion in "real-time" or during a playback of the input. In performing the offline haptic conversion, the system can first receive the input from a source, such as a multimedia file or some other type of computer file. The system can then convert the input into a haptic signal. The system can then subsequently encode the haptic signal, where the system can embed the haptic signal within the source of the original signal, and where the system can combine the haptic signal with the original input within the source. Alternatively, after encoding the haptic signal, the system can embed the haptic signal within a separate source. Further, the system can extract the encoded haptic signal from the source and decode the encoded haptic signal. The system can then send the decoded haptic signal to a haptic output device or a set of haptic output devices (such as an actuator or a set of actuators), and cause the haptic output device(s) to generate haptic effects based on the decoded haptic signal. The system can further synchronize the playback of the haptic effects with the playback of other effects generated by the system (such as audio effects and video effects) either based on the input or with the input.

Figure 1:
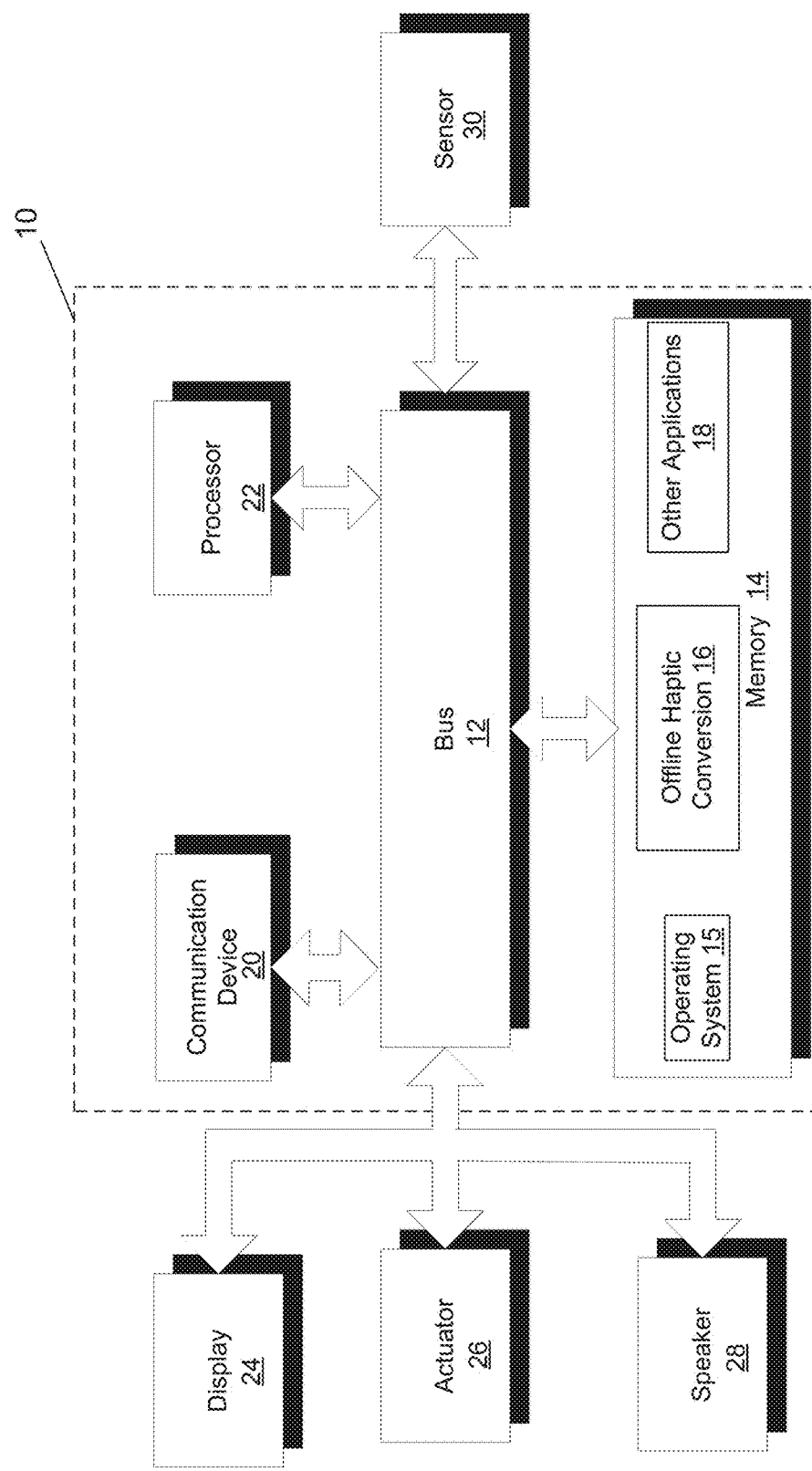
FIG. 1 illustrates a block diagram of a system in accordance with one embodiment of the invention.

FIG. 1 illustrates a block diagram of a system 10 in accordance with one embodiment of the invention. In one embodiment, system 10 is part of a mobile device, and system 10 provides an offline haptic conversion functionality for the mobile device. In another embodiment, system 10 is part of a wearable device, and system 10 provides a haptic effect pattern transformation functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the haptic effect pattern transformation functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include an offline haptic conversion module 16 that controls a conversion of an input into a haptic signal, an encoding of the haptic signal, a decoding of the haptic signal, and a playback of one or more haptic effects based on the haptic signal, as disclosed in more detail below. In certain embodiments, offline haptic conversion module 16 can comprise a plurality of modules, where each module provides specific individual functionality for controlling a conversion of an input into a haptic signal, an encoding of the haptic signal, a decoding of the haptic signal, and a playback of one or more haptic effects based on the haptic signal. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20.

Figure 2:
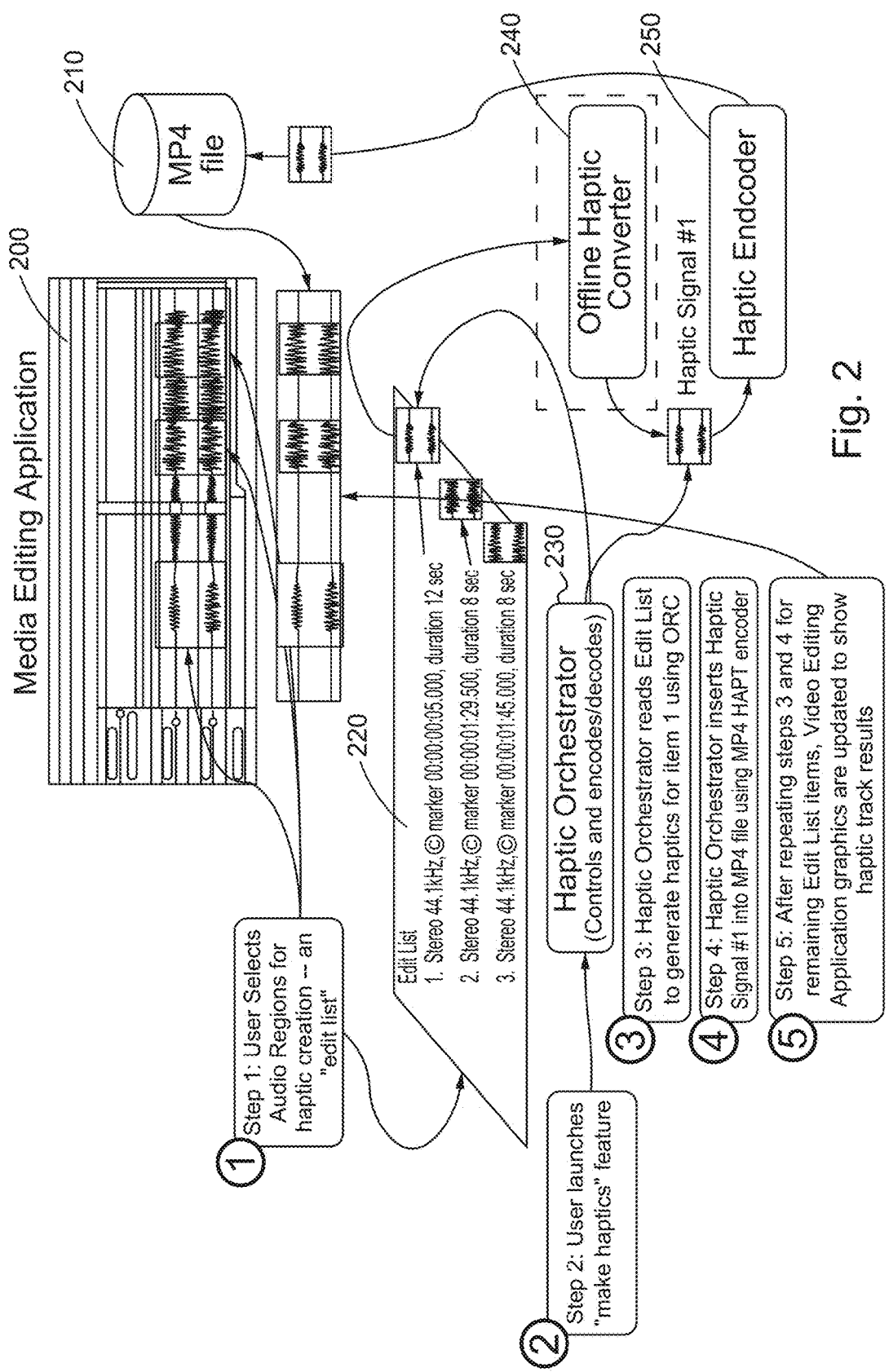
FIG. 2 illustrates a system that performs an offline haptic conversion of an input signal into a haptic signal and an encoding of the haptic signal, according to an embodiment of the invention.

FIG. 2 illustrates a system that performs an offline haptic conversion of an input signal into a haptic signal and an encoding of the haptic signal, according to an embodiment of the invention. In one embodiment, the functionality of FIG. 2, as well as the functionality of FIGS. 3, 4, 5, and 12 described below, are implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The system illustrated in FIG. 2 includes a media editing application 200. Media editing application 200 is an application configured to perform the functionality of editing an input signal, such as an audio signal that includes audio data, a video signal that includes video data, or a multimedia signal that includes both an audio signal and a video signal. In performing the functionality of editing the input signal, media editing application 200 can display a user interface to a user, where the user interface includes a visual representation of the input signal, and where a user can modify one or more portions of the input signal, or the entire input signal, by interacting with the user interface. In the illustrated embodiment, the input signal is a multimedia signal that includes a video signal and two audio signals. However, this is an example embodiment, and in alternate embodiments, a multimedia signal can include any number of audio signals, and can include any number of video signals. In alternate embodiments, the input signal can be another type of input signal, such as an audio signal, a video signal, an acceleration signal, an orientation signal, an ambient light signal, or another type of signal that can include data captured with a sensor. Further, in other alternate embodiments where the input signal is a multimedia signal, the multimedia signal can include other types of signals in addition to audio signals and video signals, such as acceleration signals, orientation signals, ambient light signals, or other types of signals that can include data captured with a sensor.

Media editing application 200 can receive the multimedia signal by extracting an encoded multimedia signal from multimedia file 210, and decoding the encoded multimedia signal. Multimedia file 210 is a computer file that stores data, such as an encoded multimedia signal or other type of encoded signal. In one example embodiment, multimedia file 210 can be a MPEG-4 Part 14 ("MP4") file. Specific details regarding a MP4 file can be found in the MPEG4 Part-1 Standard (ISO/IEC 14496-1 Systems), the MPEG4 Part-3 Standard (ISO/IEC 14496-3 Audio), and the MPEG4 Part-12 Standard (ISO/IEC 14496-12 Media File Format), the contents of which are herein incorporated by reference in their entirety.

At 1, a user selects one or more portions of an audio signal contained within the multimedia signal (identified in FIG. 2 as "audio regions"). The system creates an edit list 220 which is a list that includes the one or more portions of the audio signal. In an alternate embodiment, rather than selecting one or more portions of the audio signal, the user can select the entire audio signal. Further, in alternate embodiments, a user can select another type of signal contained within the multimedia signal, such as a video signal.

At 2, the user instructs the system to convert the one or more portions of the audio signal into one or more haptic signals (identified in FIG. 2 as "launches 'make haptics' feature"). A haptic signal is a signal that can be associated with one or more haptic effects, and the haptic signal can be sent to a haptic output device, such as an actuator, where the haptic output device can output the one or more haptic effects based on the haptic signal. An example of a haptic effect is a vibrotactile haptic effect that can produce a vibration that is felt by a user of the haptic output device. Other examples of haptic effects can include electrostatic friction haptic effects, or deformation haptic effects. A haptic signal can include data, such as a waveform, where a waveform is a set of one or more signal values in a pulse-coded modulation ("PCM") format. According to the embodiment, the system invokes a haptic orchestrator module 230, where haptic orchestrator module 230 is a module that controls the conversion of the one or more portions of the audio signal into one or more haptic signals, and also controls the encoding of the one or more haptic signals. In an alternate embodiment where a user selects the entire audio signal, the user can instruct the system to convert the entire audio signal into one or more haptic signals, and haptic orchestrator module 230 can control the conversion of the entire audio signal into one or more haptic signals.

At 3, haptic orchestrator module 230 reads edit list 220, selects a first item from edit list 220 (i.e., a first portion of the audio signal) and invokes an offline haptic converter module 240. Offline haptic converter module 240 is a module that converts input, such as an audio signal, or a portion of an audio signal, into one or more haptic signals. Offline haptic converter module 240 can take as input: (1) a data buffer of arbitrary size that include data, such as PCM audio data; (2) a number of channels in the data buffer; (3) bits per sample of the data buffer; and (4) a sample rate of the data buffer. Offline haptic converter module 240 can further produce as output: a data buffer containing a haptic signal that includes haptic data that controls the generation of one or more haptic effects via a haptic output device. In one embodiment, the haptic signal can be a single channel that includes a sequence of magnitude values that change at a "haptic frame rate." A haptic frame rate defines a rate at which haptic data is output by offline haptic converter module 240. The haptic frame rate can be set to a rate that matches an audio frame rate or a video frame rate of an input signal, such as an audio signal, a video signal, or a multimedia signal. Alternately, a haptic frame rate can be defined as a number of audio (or video) samples per haptic sample. In one embodiment, offline haptic converter module 240 can include a configuration interface that allows a user to set the haptic frame rate (e.g., from 15 frames per second to 60 frames per second). Further, in one embodiment, offline haptic converter module 240 can also expose methods that allow a user to change existing haptic parameters (such as strength, density, or sharpness) before the start of a haptic conversion operation.

Offline haptic converter module 240 can use any haptic conversion algorithm that is known to one of ordinary skill in the relevant art to convert the input into the one or more haptic signals. For example, offline haptic converter module 240 can use a haptic conversion algorithm that identifies a maximum amplitude value for each portion of the input, and generates a haptic signal for each portion of the input based on the identified maximum amplitude value where the identified maximum amplitude value defines a magnitude of the haptic signal. Example haptic conversion algorithms are described in the following patents or patent applications (all of which are hereby incorporated by reference in their entirety): U.S. Pat. Nos. 7,979,146; 8,000,825; 8,378,964; U.S. Pat. App. Pub. No. 2011/0202155; U.S. Pat. App. Pub. No. 2011/0215913; U.S. Pat. App. Pub. No. 2012/0206246; U.S. Pat. App. Pub. No. 2012/0206247; U.S. Pat. App. Pub. No. 2013/0265286; U.S. Pat. App. Pub. No. 2013/0131851; U.S. Pat. App. Pub. No. 2013/0207917; U.S. Pat. App. Pub. No. 2013/0335209; U.S. Pat. App. Pub. No. 2014/0064516; U.S. patent application Ser. No. 13/661,140; U.S. patent application Ser. No. 13/785,166; U.S. patent application Ser. No. 13/788,487; U.S. patent application Ser. No. 14/078,438; U.S. patent application Ser. No. 14/078,442; U.S. patent application Ser. No. 14/078,445; U.S. patent application Ser. No. 14/051,933; U.S. patent application Ser. No. 14/020,461; and U.S. patent application Ser. No. 14/020,502.

In one embodiment, one or more portions of an encoded audio signal, or other type of signal, can be extracted from multimedia file 210, decoded, and sent to offline haptic converter module 240 via one or more invocations of offline haptic converter module 240, where offline haptic converter module 240 can convert each portion of the audio signal into one or more haptic signals, and can output the one or more haptic signals. This is identified as "step-wise conversion," and is illustrated in FIG. 2. In an alternate embodiment, an entire audio signal, or other type of signal, can be extracted from multimedia file 210, decoded, and sent to offline haptic converter module 240 via a single invocation of offline haptic converter module 240, where offline haptic converter module 240 can convert the entire audio signal into one or more haptic signals, and can output the one or more haptic signals. This is identified as "whole conversion."

According to an embodiment, offline haptic conversion module 240 can perform a haptic conversion of an entire input signal (or one or more portions of an input signal) into one or more haptic signals "offline." In performing the haptic conversion "offline," offline haptic conversion module 240 can perform the haptic conversion before a playback of the input signal by media editing application 200.

At 4, haptic orchestrator module 230 invokes a haptic encoder module 250. Haptic encoder module 250 is a module that encodes the one or more haptic signals into an encoded format and stores the encoded one or more haptic signals within multimedia file 210. In storing the encoded one or more haptic signals within multimedia file 210, haptic encoder module 250 can define and place each haptic signal of the one or more haptic signals within multimedia file 210. Thus, the one or more haptic signals can be embedded within multimedia file 210, where the one or more haptic signals are combined with the original multimedia signal. In an alternate embodiment, haptic encoder module 250 can store the encoded one or more haptic signals within a multimedia file that is separate from multimedia file 210 (not illustrated in FIG. 2). Further, in another alternate embodiment, haptic encoder module 250 can additionally store one or more encoded haptic signals based on one or more pre-defined haptic effects within multimedia file 210, or a separate multimedia file. The functionality of encoding a haptic signal and storing the encoded haptic signal within a multimedia file is further described below in greater detail in conjunction with FIGS. 6-11. Further, the system repeats 3 and 4 for each item from edit list 220 (i.e., each portion of the audio signal).

At 5, media editing application 200 updates the visual representation of the multimedia signal to include a representation of the one or more generated haptic signals.

Figure 3:
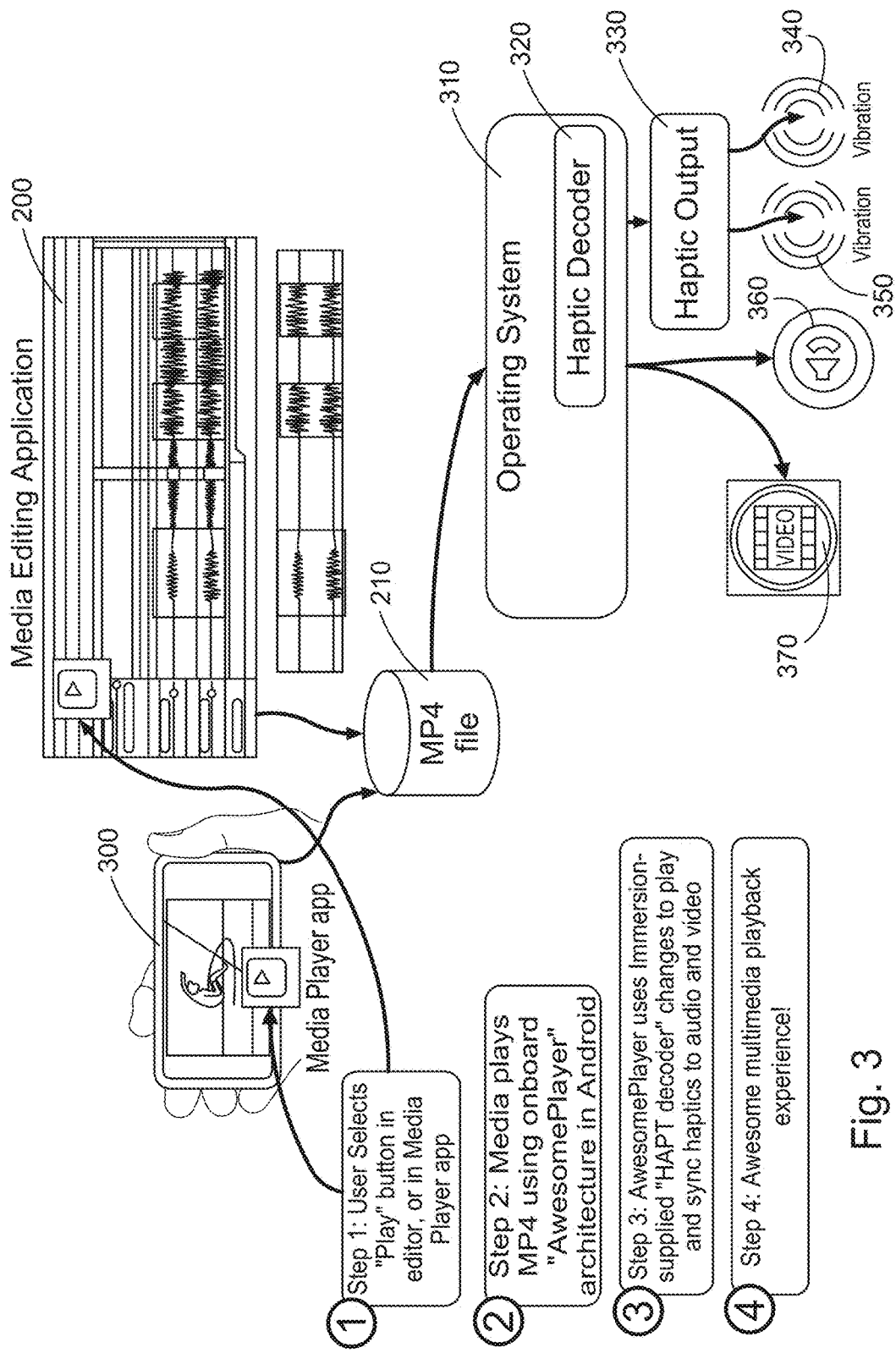
FIG. 3 illustrates a system that performs a decoding of a haptic signal and a playback of one or more haptic effects based on the haptic signal, according to an embodiment of the invention.

FIG. 3 illustrates a system that performs a decoding of a haptic signal and a playback of one or more haptic effects based on the haptic signal, according to an embodiment of the invention. The system illustrated in FIG. 3 includes media editing application 200 and/or media player application 300. Media editing application 200 is previously described above in conjunction with FIG. 2. Media player application 300 is an application configured to perform the functionality of playing an input signal, such as an audio signal that includes audio data, a video signal that includes video data, or a multimedia signal that includes both an audio signal and a video signal.

At 1, a user instructs the system to play an input signal, such as an audio signal that includes audio data, a video signal that includes video data, or a multimedia signal that includes both an audio signal and a video signal, which is encoded and stored within multimedia file 210. In the illustrated embodiment, the encoded input signal stored within multimedia file 210 is an encoded multimedia signal. Multimedia file 210 is previously described above in conjunction with FIG. 2. According to the embodiment, multimedia file 210 further includes one or more encoded haptic signals that are combined with the encoded multimedia signal within multimedia file 210. In one embodiment, the user can instruct the system to play the multimedia signal by interacting with a user interface of media editing application 200. In an alternate embodiment, the user can instruct the system to play the multimedia signal by interacting with a user interface of media player application 300.

At 2, either media editing application 200 or media player application 300 play the multimedia signal. According to the embodiment, media editing application 200 or media player application 300 retrieve the encoded multimedia signal from multimedia file 210, decode the encoded multimedia signal, and play the decoded multimedia signal.

At 3, an operating system module 310, which is a module configured to provide operating system functionality, invokes a haptic decoder module 320. Haptic decoder module 320 is a module configured to extract the one or more encoded haptic signals from multimedia file 210 and decode the one or more encoded haptic signals. The functionality of decoding an encoded haptic signal is further described below in greater detail in conjunction with FIGS. 6-11.

At 4, haptic decoder module 320 produces haptic output 330. Haptic decoder module 320 can produce haptic output 330 by sending the one or more haptic signals to one or more haptic output devices, such as actuators, where the one or more haptic signals cause the one or more haptic output devices to produce one or more haptic effects. Haptic output 330 can include vibrotactile effects, such as vibrotactile effects 340 and 350.

Haptic decoder module 320 further synchronizes the playback of haptic output with the playback of audio output and/or video output, such as audio effect 360 and video effect 370. Thus, haptic decoder module 320 can synchronize the sending of the one or more haptic signals to one or more haptic output devices with the sending one or more audio signals to an audio output device, such as a speaker, and/or the sending of one or more video signals to a video output device, such as a display. To facilitate this synchronization, haptic decoder module 320 can synchronize the haptic data of the one or more haptic signals with the audio data of the one or more audio signals and/or the video data of the one or more haptic signals. More specifically, haptic decoder module 320 can repeatedly invoke a module configured to send a haptic signal to a haptic output device at a rate equal to a haptic frame rate, where the haptic frame rate is defined to be an identical rate to an audio frame rate used to send an audio signal to an audio output device and/or a video frame rate used to send a video signal to a video output device. Thus, because the haptic frame rate is identical to the audio frame rate and/or the video frame rate, an audio effect and/or a video effect can be output at a time that is identical, or substantially identical (e.g., within 1 second), to a time when a haptic effect is output.

Figure 4:
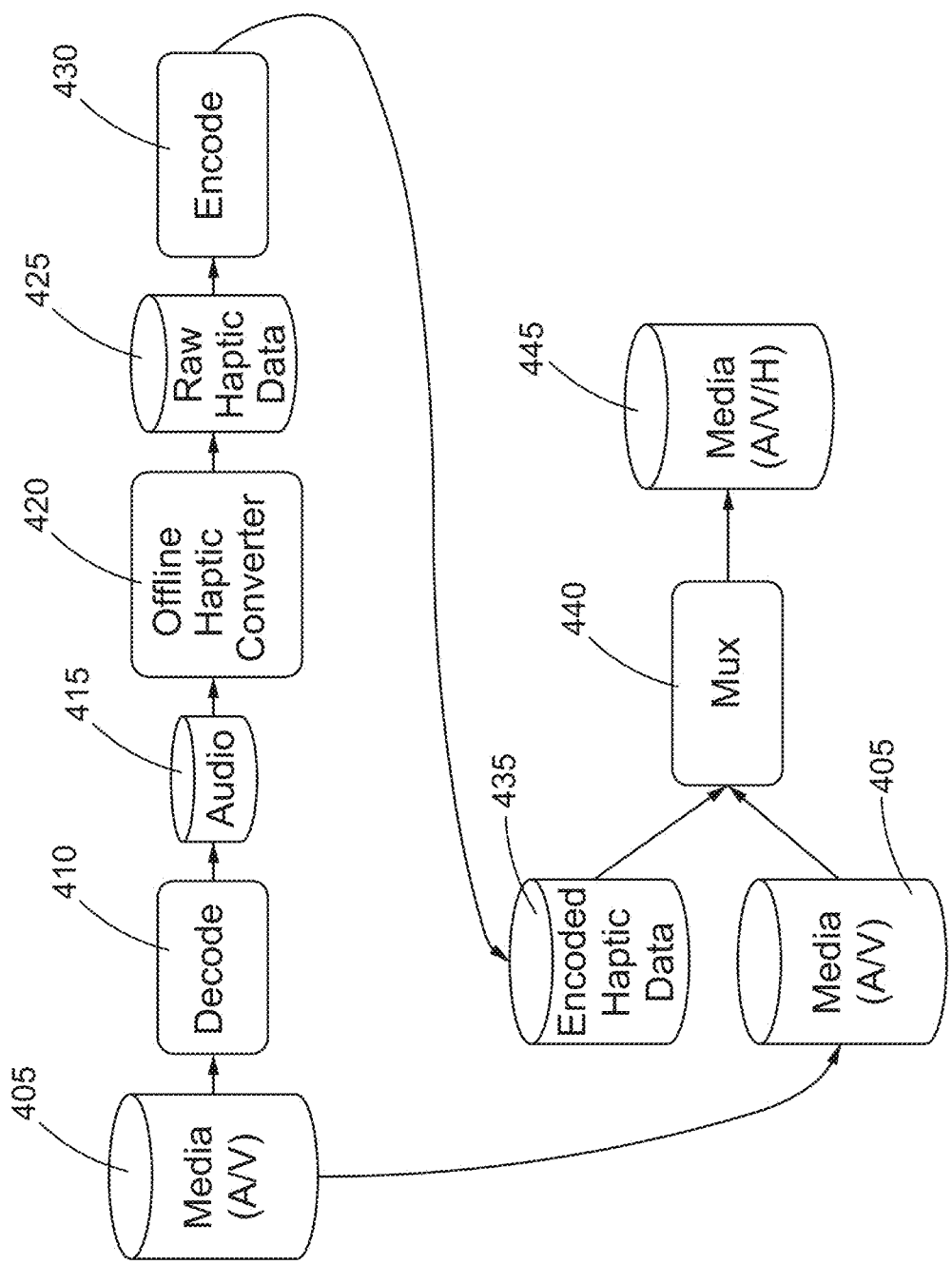
FIG. 4 illustrates a flow diagram of an offline haptic conversion of an input signal into a haptic signal and an encoding of the haptic signal, according to an embodiment of the invention.

FIG. 4 illustrates a flow diagram of an offline haptic conversion of an input signal into a haptic signal and an encoding of the haptic signal, according to an embodiment of the invention. According to the embodiment, the input signal is a multimedia signal 405 that includes an audio signal and a video signal. However, in alternate embodiments, the input signal can be another type of input signal, such as an audio signal, a video signal, an acceleration signal, an orientation signal, an ambient light signal, or another type of signal that can include data captured with a sensor. Further, in alternate embodiments where the input signal is a multimedia signal, the multimedia signal can include any number of audio signals, can include any number of video signals, and/or can include other types of signals in addition to audio signals and video signals, such as acceleration signals, orientation signals, ambient light signals, or other types of signals that can include data captured with a sensor. According to the embodiment, multimedia signal 405 can be an encoded multimedia signal and can be stored within a source, such as a multimedia file.

At 410, the audio signal of multimedia signal 405 is extracted and decoded into audio signal 415. Audio signal 415 is then sent to an offline haptic converter module 420 as input. Offline haptic converter module 420 converts audio signal 415 into a haptic signal 425. Haptic signal 425 is a signal that includes haptic data, where the haptic data includes a PCM stream or sequence of amplitude values. According to the embodiment, offline haptic converter module 415 can use any haptic conversion algorithm that is known to one of ordinary skill in the relevant art to convert audio signal 415 into haptic signal 425. Further, in an embodiment, offline haptic converter module 415 can perform the haptic conversion "offline," where offline haptic conversion module 420 can perform the haptic conversion before a playback of the audio signal.

At 430, haptic signal 425 is encoded into encoded haptic signal 435. Further, at 440, encoded haptic signal 435 and multimedia signal 405 are multiplexed (i.e., combined) into multimedia signal 445, where multimedia signal 445 includes an audio signal, a video signal, and a haptic signal (i.e., encoded haptic signal 435). The encoding of haptic signal 425 into encoded haptic signal 435 and the multiplexing of encoded haptic signal 435 and multimedia signal 405 is further described below in greater detail in conjunction with FIGS. 6-11.

Figure 5:
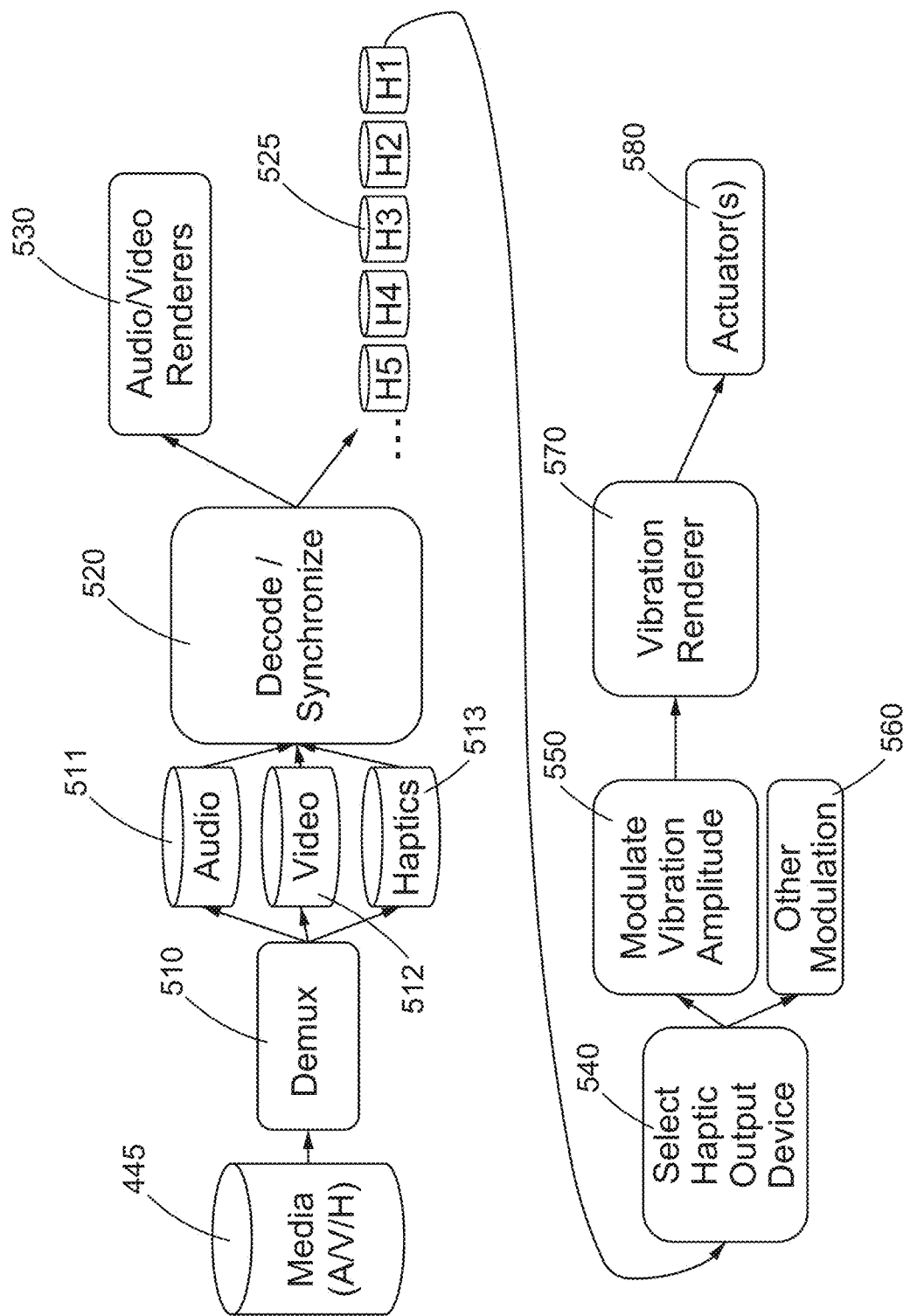
FIG. 5 illustrates a flow diagram of a decoding of a haptic signal and a playback of one or more haptic effects based on the haptic signal, according to an embodiment of the invention.

FIG. 5 illustrates a flow diagram of a decoding of a haptic signal and a playback of one or more haptic effects based on the haptic signal, according to an embodiment of the invention. At 510, multimedia signal 445 is demultiplexed (i.e., segmented) into an audio signal 511, a video signal 512, and a haptic signal 513. Multimedia signal 445 is previously described above in conjunction with FIG. 4, and is not described again.

At 520, audio signal 511, video signal 512, and haptic signal 513 are each decoded. Further, after audio signal 511 and video signal 512 are decoded, they are sent to audio/video renderers 530, where audio/video renderers 530 control the output of one or more audio effects at one or more audio output devices, and the output of one or more video effects at one or more video output devices. According to the embodiment, the one or more audio effects are output based on audio signal 511, and the one or more video effects are output based on video signal 512. In certain embodiments, each audio output device is a speaker, and each video output device is a display. Further, haptic signal 513 is decoded into decoded haptic signal 525. According to the embodiment, decoded haptic signal 525 is a signal that includes decoded haptic data, where the decoded haptic data includes a PCM stream or sequence of amplitude values. After haptic signal 513 is decoded into decoded haptic signal 525, decoded haptic signal 525 is sent to vibration renderer 570, where the sending of haptic signal 525 to vibration renderer 570 is further described below in greater detail. According to the embodiment, vibration renderer 570 controls the output of one or more haptic effects at a haptic output device, where the output of the one or more haptic effects is also further described below in greater detail. Further, the sending of audio signal 511 and video signal 512 to audio/video renderers 530, and the sending of decoded haptic signal 520 to vibration renderer 570 can be synchronized so that the one or more audio effects and the one or more video effects are output at a time that is identical, or substantially identical to a time when the one or more haptic effects are output.

At 540 one or more haptic output devices are selected. At 550, an amplitude haptic parameter of decoded haptic signal 525 is modulated, which configures decoded haptic signal 525 for the selected haptic output device(s). At 560, other haptic parameters, such as a strength haptic parameter, a density haptic parameter, or a sharpness haptic parameter are modulated so that decoded haptic signal 525 is configured for the selected haptic output device(s). In certain embodiments, the functionality performed at 540, 550, and 560 can be omitted. Further, after decoded haptic signal 525 is modulated, decoded haptic signal 525 is sent to vibration renderer 570, where vibration renderer 570 controls the output of one or more haptic effects at actuator(s) 580, where an actuator is an example of a haptic output device. According to the embodiment, the one or more haptic effects are output based on decoded haptic signal 525.

The functionality of encoding a haptic signal and storing the encoded haptic signal within a multimedia file, such as an MP4 file, is now described in greater detail, according to an example embodiment. While an example implementation of the encoding of the haptic signal and the storage of the encoded haptic signal within a multimedia file is described, one of ordinary skill in the relevant art would readily appreciate that, in other alternate embodiments, the encoding of the haptic signal and the storage of the encoded haptic signal within a multimedia file could be implemented differently. As previously described, a multimedia file can include a encoded multimedia signal, where the encoded multimedia signal can include any number of encoded signals, such as encoded audio signals and encoded video signals. According to an embodiment, a haptic signal can be encoded and stored within the multimedia file, where the encoded haptic signal is interleaved, or combined, with the other encoded audio signals and/or encoded video signals stored within the multimedia file.

According to an embodiment, an encoded haptic signal is similar to an encoded audio signal (or another type of encoded signal) in that both encoded signals include data, such as a waveform, where a waveform is a set of one or more signal values in a PCM format. Thus, it is important that an encoded haptic signal be formatted within a multimedia file, so that the encoded haptic signal is not mistaken for another type of encoded signal (such as an encoded audio signal), and vice versa. Further, a multimedia file is a series of objects, identified as boxes. All data is stored in boxes; there is no other data stored within the multimedia file. Thus, the encoded signals of the multimedia file are stored in boxes of the multimedia file. Thus, according to the embodiment, an encoded haptic signal is stored within a separate "trak" box within a standard "moov" box, alongside other trak boxes that exist for audio and video. The following table illustrates a haptic box structure:

According to the embodiment, a separate "hapt" box can indicate that the encoded signal is an encoded haptic signal, in order to ensure that the encoded haptic signal is not rendered as another type of media, such as audio or video. Additionally, to further ensure that the encoded haptic signal is not rendered as another type of media, the encoded haptic signal can be denoted as a timed metadata track (i.e., "meta"). This can be done by setting a handler_type field to a value of "meta" in an "hdlr" box. A timed metadata track is configured to store time-based media data. Storing an encoded haptic signal in this type of track, or stream, allows the encoded haptic signal to be considered media, but not of a media format that is a format other than a haptic format, such as an audio format or a video format. Thus, specifying a timed metadata stream for an encoded haptic signal can ensure that during playback, the encoded haptic signal is not rendered as another type of media, such as audio or video, despite a format of the encoded haptic signal being similar to a format of another type of encoded signal, such as an encoded audio signal or an encoded video signal.

Figure 6:
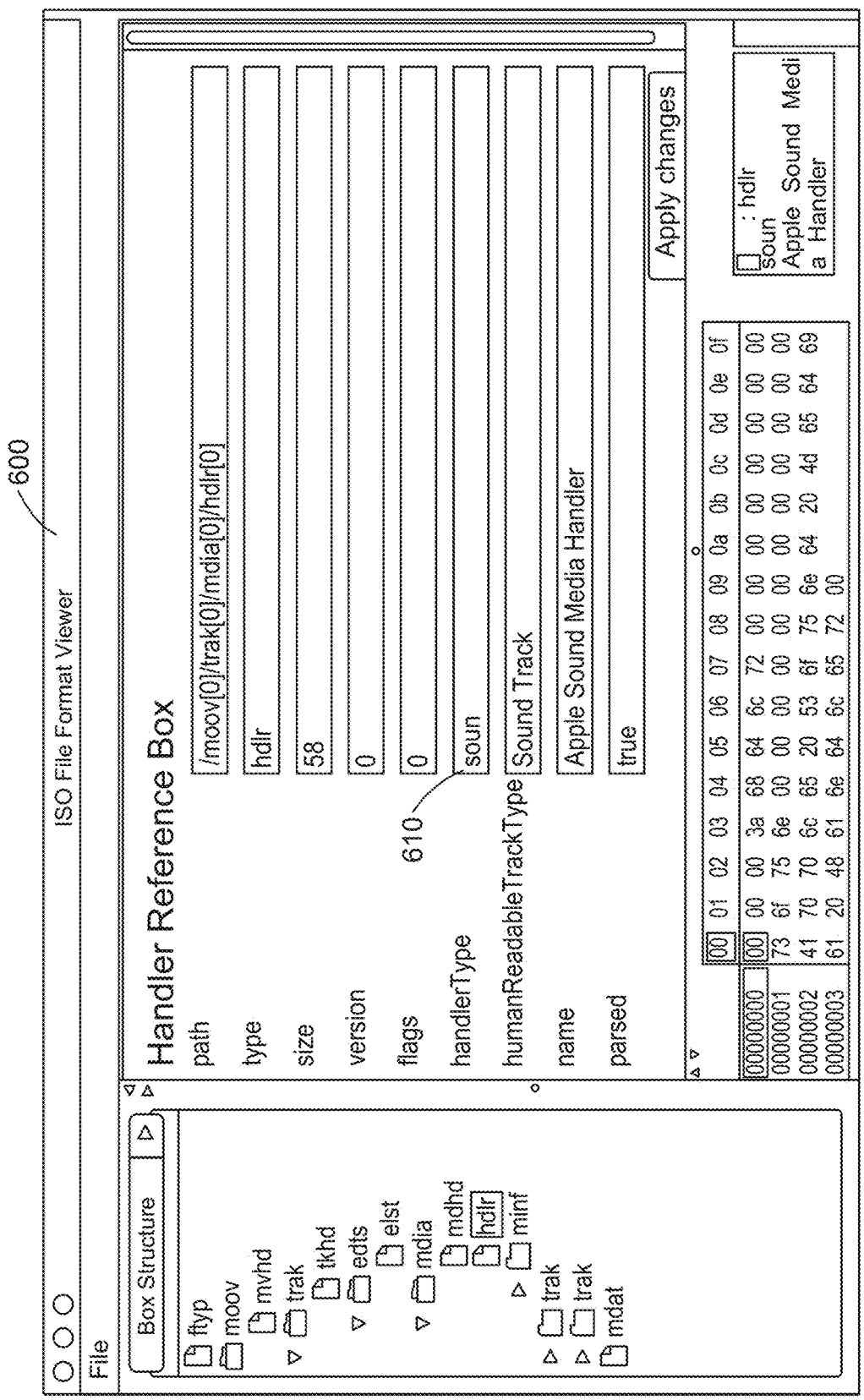
FIG. 6 illustrates a handler box structure for an audio component of an encoded multimedia signal, according to an embodiment of the invention.

FIG. 6 illustrates a handler box structure 600 for an audio component of an encoded multimedia signal, according to an embodiment of the invention. According to the embodiment, an encoded multimedia signal includes an audio component which is an encoded audio signal. The encoded audio signal is stored within a trak box of a multimedia file. Further, the trak box includes a handler (or "hdlr") box with handler box structure 600. Handler box structure 600 includes a handlerType field 610 with a value of "soun," which indicates that the track is a sound track.

Figure 7:
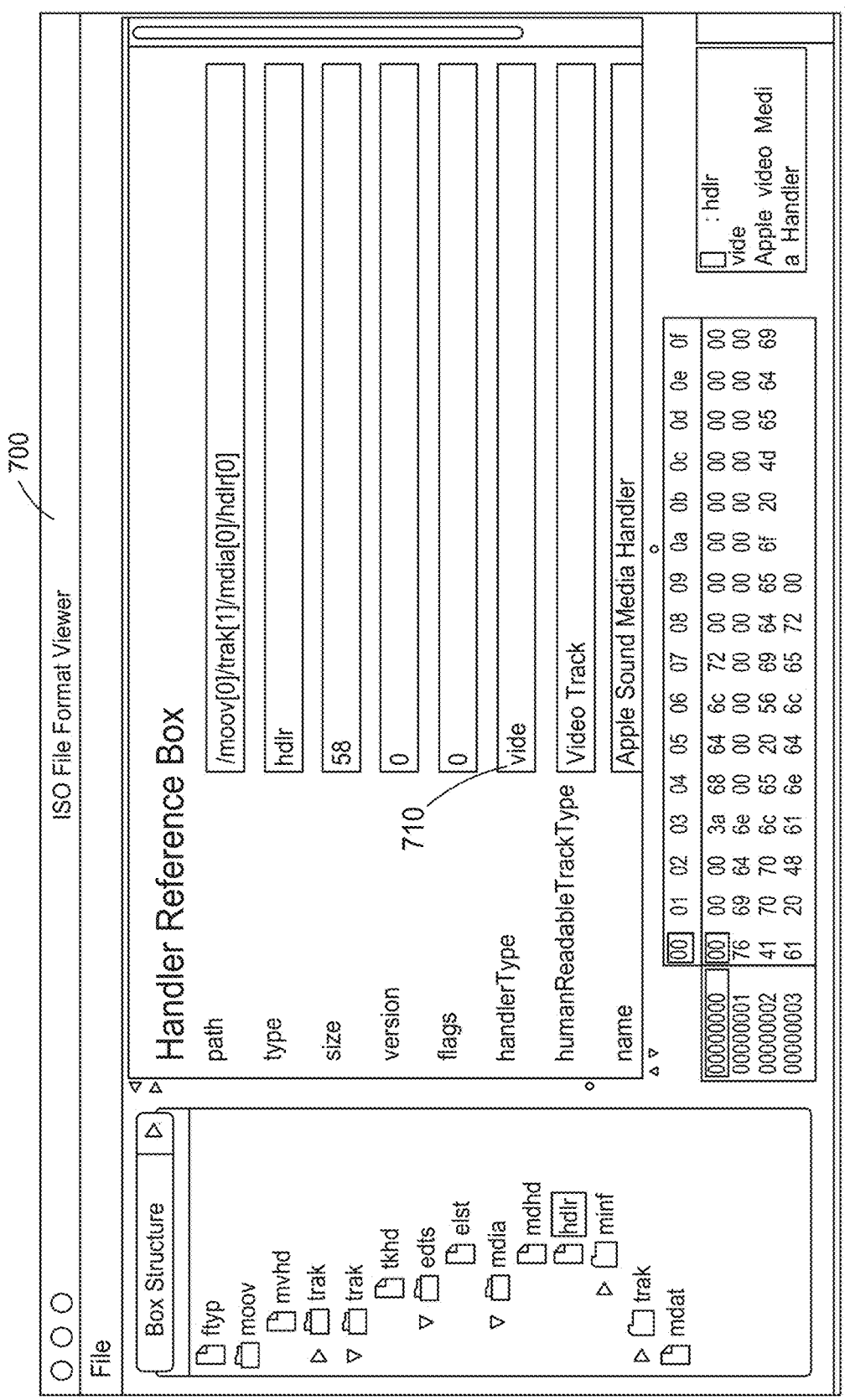
FIG. 7 illustrates a handler box structure for a video component of an encoded multimedia signal, according to an embodiment of the invention.

FIG. 7 illustrates a handler box structure for a video component of an encoded multimedia signal, according to an embodiment of the invention. According to the embodiment, an encoded multimedia signal includes a video component which is an encoded video signal. The encoded video signal is stored within a trak box of a multimedia file. Further, the trak box includes an hdlr box with handler box structure 700. Handler box structure 700 includes a handlerType field 710 with a value of "vide," which indicates that the track is a video track.

Figure 8:
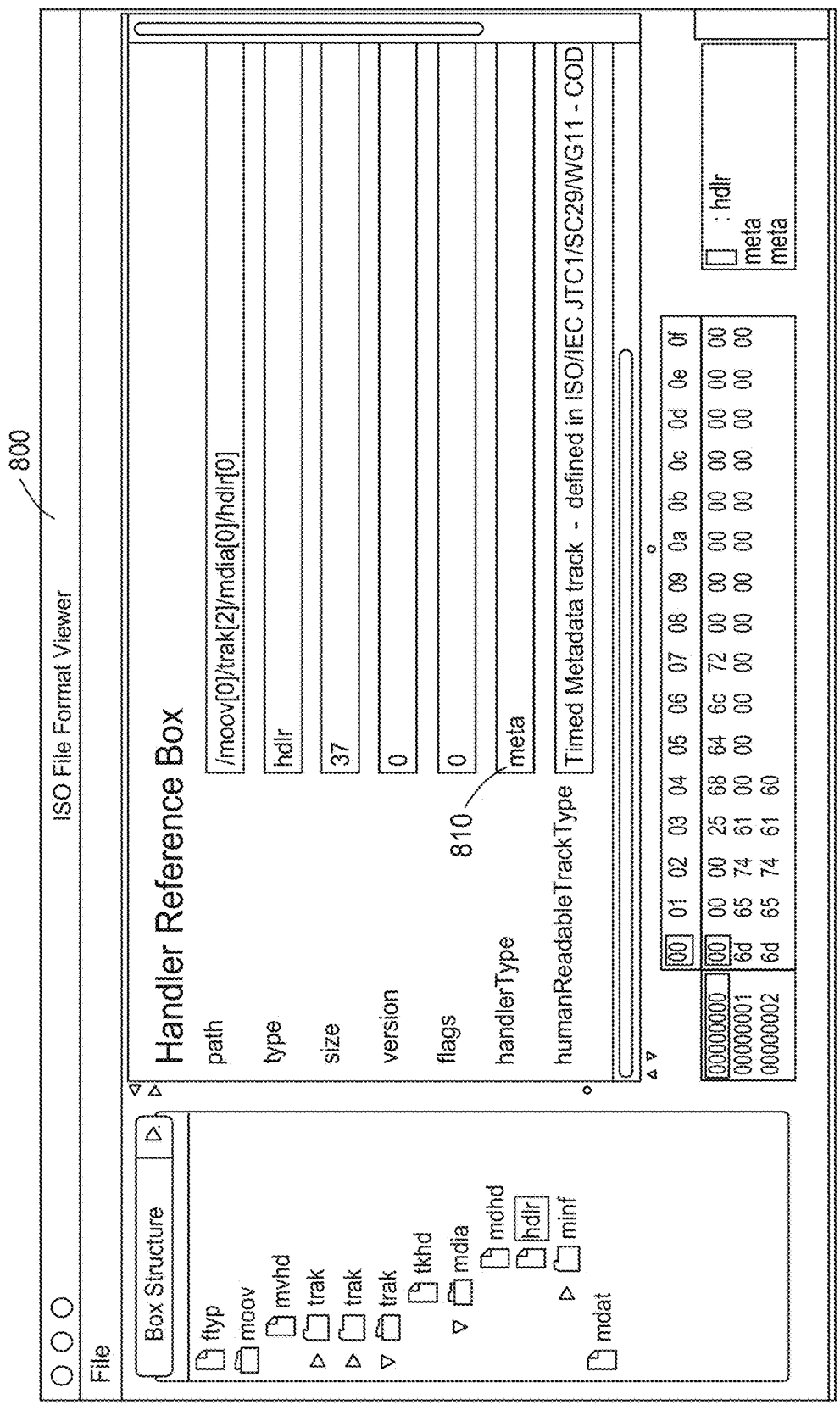
FIG. 8 illustrates a handler box structure for a haptic component of an encoded multimedia signal, according to an embodiment of the invention.

FIG. 8 illustrates a handler box structure for a haptic component of an encoded multimedia signal, according to an embodiment of the invention. According to the embodiment, an encoded multimedia signal includes a haptic component which is an encoded haptic signal. The encoded haptic signal is stored within a "trak" box of a multimedia file. Further, the trak box includes an hdlr box with handler box structure 800. Handler box structure 800 includes a

| Box Hierarchy | | | | | | | Description |
|---|---|---|---|---|---|---|---|
| moov | | | | | | | Container for all metadata |
| | trak | | | | | | Container for an individual track or stream |
| | | mdia | | | | | Container for the media information in a track |
| | | | mdhd | | | | Media header, overall information about the media |
| | | | hdlr | | | | Declares the media (handler) type |
| | | | minf | | | | Media information container |
| | | | | nmhd | | | Null media header |
| | | | | stbl | | | Sample Table Box |
| | | | | | stsd | | Sample Descriptions (codec types, initialization, etc.) |
| | | | | | | hapt | Haptic box, indicating this track as a haptic stream |
| | | | | | | esds | Elementary Stream Description | handlerType field 810 with a value of "meta," which indicates that the track is a haptic track.

Figure 9:
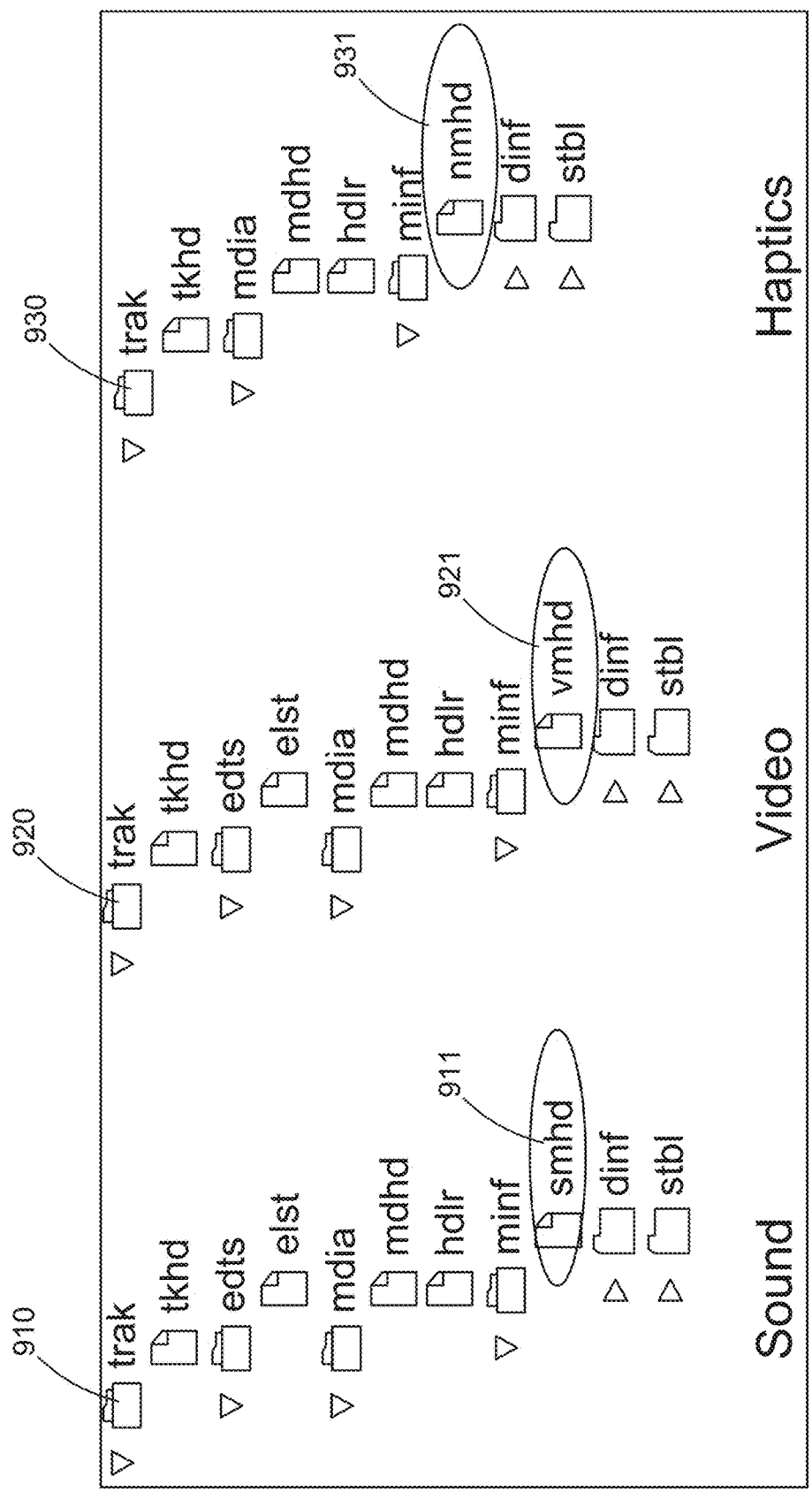
FIG. 9 illustrates header box structures for an audio component, a video component, and a haptic component of an encoded multimedia signal, according to an embodiment of the invention.

FIG. 9 illustrates header box structures for an audio component, a video component, and a haptic component of an encoded multimedia signal, according to an embodiment of the invention. According to the embodiment, a multimedia signal includes an audio component which is an encoded audio signal, a video component which is an encoded video signal, and a haptic component which is an encoded haptic signal. The encoded audio signal is stored within a trak box 910 of a multimedia file. Trak box 910 includes a "smhd" box 911 under a "minf" container box, where smhd box 911 is a sound media header box that indicates that the track is an audio track. The encoded video signal is stored within a trak box 920 of the multimedia file. Trak box 920 includes a "vmhd" box 921 under a minf container box, where vmhd box 921 is a video media header box that indicates that the track is a video track. The encoded haptic signal is stored within a trak box 930 of the multimedia file. Trak box 930 includes an "nmhd" box 931 under a minf container box, where nmhd box 931 is a null media header box that indicates that the track is a haptic track. More specifically, nmhd box 931 can indicate that the track is not an audio track or a video track, but can still be interpreted as a haptic track.

Further, as previously described, within a haptic box structure, such as the haptic box structure illustrated in the aforementioned table, there is a sample table box (i.e., "stbl" box). Under the stbl box, there is a sample description box (i.e., "stsd" box). In the stsd box, the format of the track can be specified. For a haptic track, as previously described, a hapt box can be defined, where the hapt box indicates that the timed metadata track contains an encoded haptic signal. In certain embodiments, the "meta" handler type can require a MetaDataSampleEntry class to be implemented, but the MetaDataSampleEntry class can be defined as an empty class that can be extended by new subclasses. Further, any haptic-specific data can be stored in an "esds" box, as is further described below in greater detail.

Additionally, any timing data, such as track duration and timescale, can be present in an "mdhd" box, where the mdhd box describes an overall duration and timescale of the haptic track. A "timescale" is a 32-bit unsigned integer that contains a number of time units which pass in one second. For example, if the haptic track has an update rate of 50 samples per second, this timescale is set to 50. A "duration" is a 64-bit unsigned integer which declares the length of the haptic track in the scale of timescale. For example, if a timescale is set to a value of 50, every sample has a length of 20 milliseconds. If a haptic track is 5 seconds long, a duration should have a value of 250 (i.e., 5*1000/20).

Further, as previously described, within a haptic box structure, such as the haptic box structure illustrated in the aforementioned table, a child box that is under the hapt container box is an elementary stream description box (i.e., "esds" box), also referred to as an ES_Descriptor. When applied to haptics, this box contains information needed to decode the stream associated with the trak box that the stream resides in.

According to an embodiment, an ES_Descriptor box contains a DecoderConfigDescriptor structure, which contains the parameters and requirements to parse and read the elementary stream. Within the DecoderConfigDescriptor, there are fields for an objectProfileIndication value and a DecoderSpecificInfo structure. An objectProfileIndication value provides an object profile type for the stream. The field can be set to a value between 0xC0 and 0xFE, a range of user-provided object profile types, which, when used within a hapt box structure, can be known as a haptic type. As is described below in greater detail in conjunction with FIGS. 10 and 11, according to the embodiment, only trak box structures that contain a hapt box, using a value between 0xC0 and 0xFE as an object profile type will be considered valid haptic streams. The DecoderSpecificInfo structure is an abstract class that is extended by other classes, based on the objectProfileIndication value. In one embodiment, this structure can be extended by a HapticSpecificConfig class which contains haptic-specific data, such as a signal type and a haptic output device (e.g., actuator), that an encoded haptic signal is created for. The HapticSpecificConfig class is further described below in greater detail.

Figure 10:
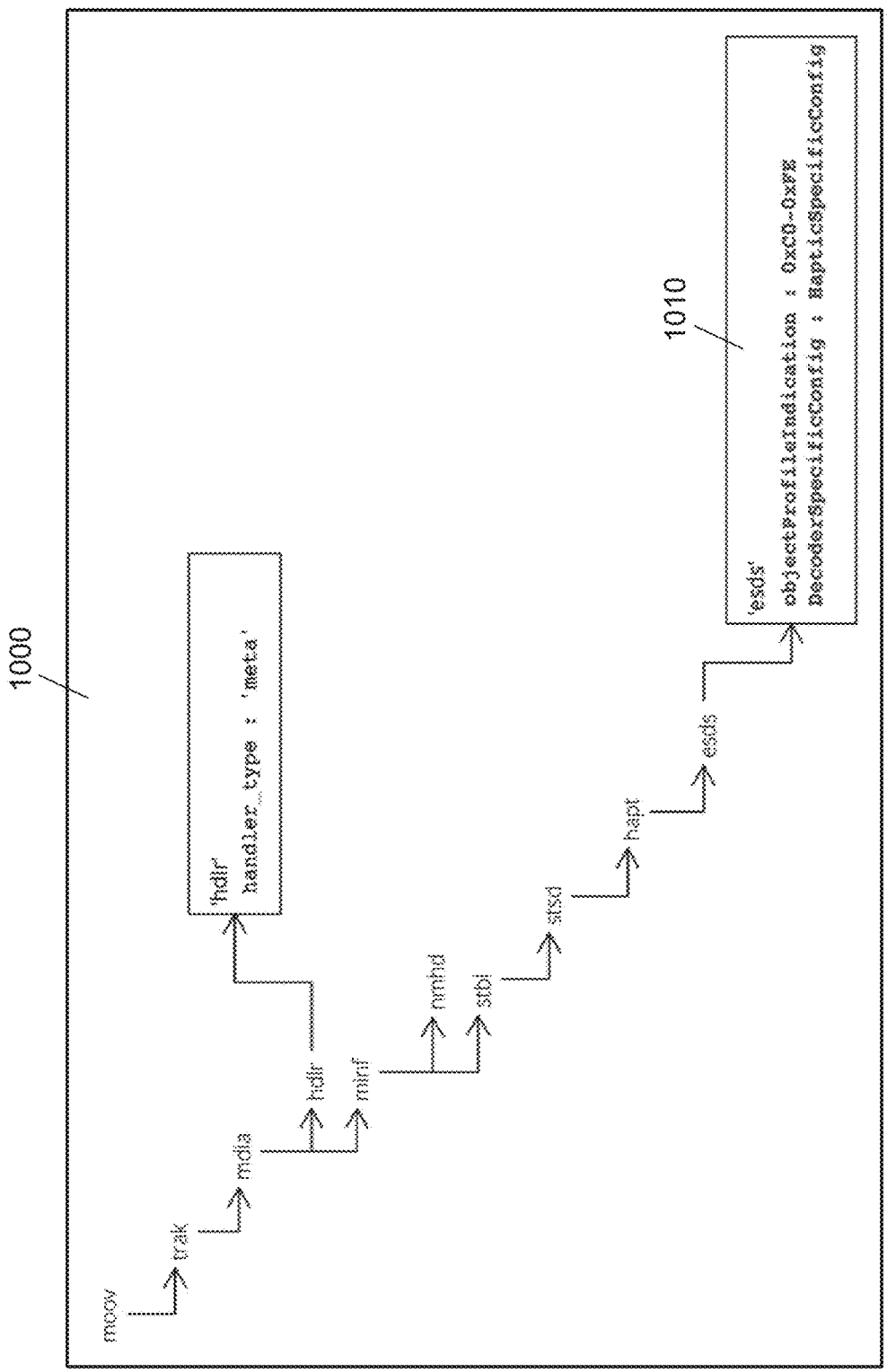
FIG. 10 illustrates a valid object profile type for a haptic component of an encoded multimedia signal, according to an embodiment of the invention.

FIG. 10 illustrates a valid object profile type for a haptic component of an encoded multimedia signal, according to an embodiment of the invention. According to the embodiment, an encoded multimedia signal includes a haptic component which is an encoded haptic signal. Further, a haptic box structure 1000 is defined for a multimedia file that stores the encoded multimedia signal. Haptic box structure 1000 includes an objectProfileIndication field 1010, with a value within a range of 0xC0 and 0xFE. Because the value of objectProfileIndication field 1010 is within a valid range, the track that contains the encoded haptic signal is considered a valid haptic track.

Figure 11:
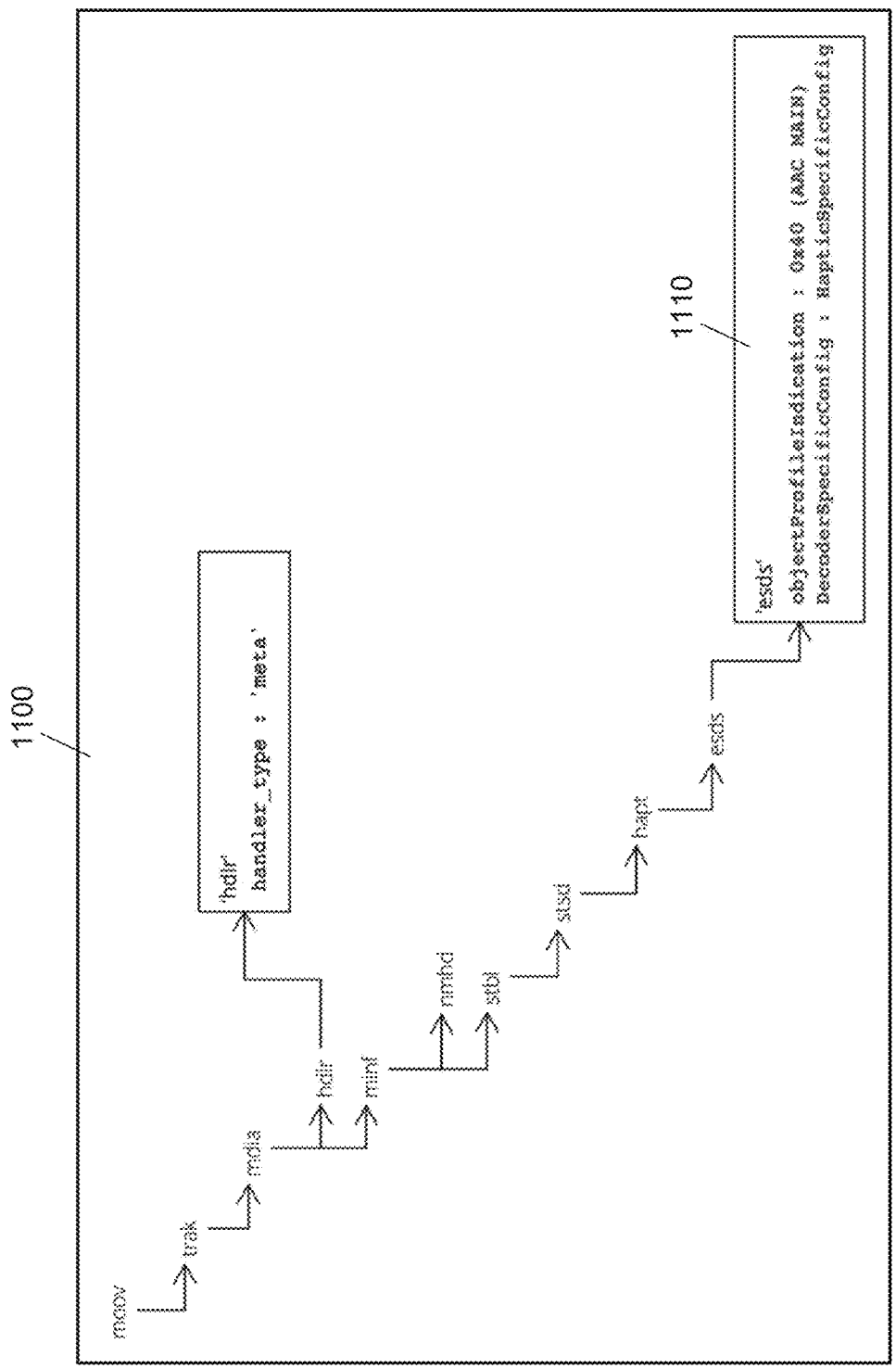
FIG. 11 illustrates an invalid object profile type for a haptic component of an encoded multimedia signal, according to an embodiment of the invention.

FIG. 11 illustrates an invalid object profile type for a haptic component of an encoded multimedia signal, according to an embodiment of the invention. According to the embodiment, an encoded multimedia signal includes a haptic component which is an encoded haptic signal. Further, a haptic box structure 1100 is defined for a multimedia file that stores the encoded multimedia signal. Haptic box structure 1100 includes an objectProfileIndication field 1110, with a value of 0x40. Because the value of objectProfileIndication field 1110 is not within a valid range, the track that contains the encoded haptic signal is not considered a valid haptic track.

Media player applications and media editing applications generally require configuration information in the elementary stream description box of a multimedia file, where the configuration information is necessary for a decoding process. Thus, the DecoderConfigDescriptor can contain a subclass of a DecoderSpecificInfo abstract class. For haptic streams, the DecoderSpecificInfo abstract class can be extended by a HapticSpecificConfig class, according to an embodiment of the invention. HapticSpecificConfig can extend the abstract class DecoderSpecificInfo, when an objectTypeIndication value and streamType value are 0xC0 and 0x20, respectively, which indicate that the stream contains haptic data. Example syntax of a HapticSpecificConfig class is shown below in the following tables:

| Syntax | No. of bits | Mnemonic |
|---|---|---|
| HapticSpecificConfig( ) { | | |
| hapticStreamType; | 2 | bslbf |
| if (hapticStreamType == 0x3) { | | |
| audioObjectType; | 5 | bslbf |
| channelConfiguration; | 4 | bslbf |
| } | | |
| else { | | |
| hapticDecoderType; | 4 | bslbf |
| actuatorConfiguration; | 4 | bslbf |
| } | | |

-continued

| Syntax | No. of bits | Mnemonic |
|---|---|---|
| samplingFrequencyIndex; | 4 | bslbf |
| if (samplingFrequencyIndex == 0xF) { | | |
|   samplingFrequency; | 24 | uimsbf |
| } | | |
| EndpointConfiguration; | 8 | bslbf |
| } | | |

| Haptic Stream Type | Description |
|---|---|
| 0x0 | Reserved |
| 0x1 | Reserved |
| 0x2 | Haptic Encoded Stream |
| 0x3 | Audio Encoded Stream |

| Sampling Frequency Index | Value |
|---|---|
| 0x0 | Reserved |
| 0x1 | 200 |
| 0x2 | 8000 |
| 0x3-0xE | Reserved |
| 0xF | Escape value |

| Actuator Configuration | Description |
|---|---|
| 0x0 | Reserved |
| 0x1 | Single Actuator |
| 0x2-0xF | Reserved |

| Value | Number of Channels |
|---|---|
| 0 | — |
| 1 | Mono |

| Endpoint Configuration | Description |
|---|---|
| 0x0 | Time-Ordered Amplitudes |
| 0x1 | PCM Waveform |
| 0x2-0xFF | Reserved |

| Haptic Decoder Type | Description |
|---|---|
| 0x0 | Raw Stream |
| 0x1-0xF | Reserved |

According to the embodiment, an encoded haptic signal is interleaved, or combined, with an encoded audio signal and/or an encoded video signal within a multimedia file. More specifically a stream that includes an encoded audio signal can be associated with a trak object that is of a sound type. Further, a stream that includes an encoded video signal can be associated with a trak object that is of a video type. In addition, a stream that includes an encoded haptic signal can be associated with a trak object that is a timed metadata type. These streams can be interleaved, or combined, in an "mdat" box which resides at a same level as a moov box in a box structure. The mdat box contains the actual data that a media editing application or a media player application parses, decoded, and renders. In extracting an encoded haptic signal from the interleaved data box and decoding the encoded haptic signal, the media editing application or media player application can reference offsets to chunks or portions of the encoded haptic signal within the sample table.

Figure 12:
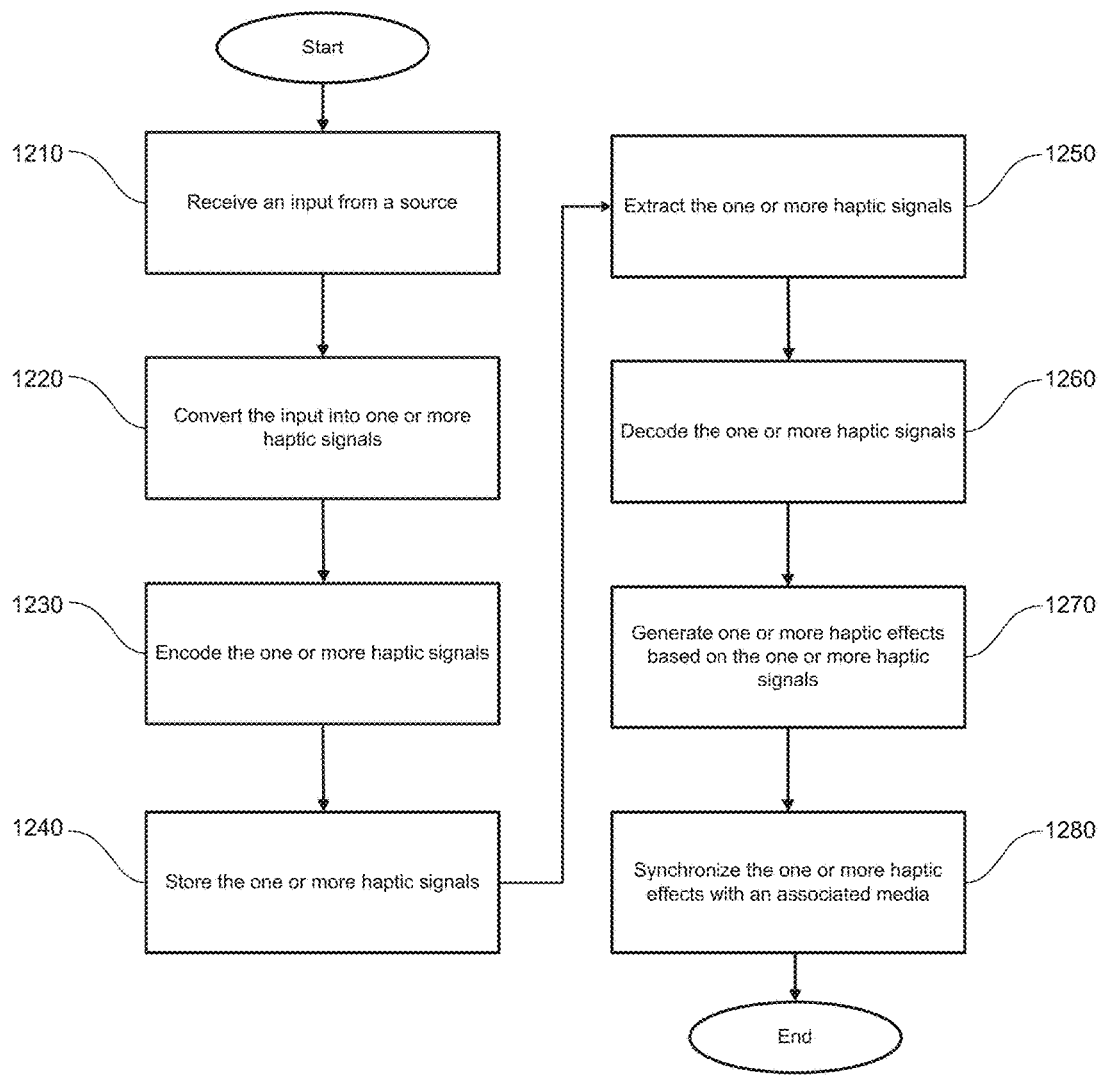
FIG. 12 illustrates a flow diagram of the functionality of an offline haptic conversion module, according to an embodiment of the invention.

FIG. 12 illustrates a flow diagram of the functionality of an offline haptic conversion module (such as offline haptic conversion module 16 of FIG. 1), according to one embodiment of the invention. The flow begins and proceeds to 1210. At 1210, an input is received from a source. In certain embodiments, the input can be one of: at least a portion of an audio signal; at least a portion of a video signal; or at least a portion of a multimedia signal that includes both an audio signal and a video signal. Further, in certain embodiments, the source is a multimedia file. In embodiments where the source is a multimedia file, an input signal can be extracted from the multimedia file, and the input signal can be decoded. The flow then proceeds to 1220.

At 1220, the input is converted into one or more haptic signals. In certain embodiments, an input signal is extracted from the source, and the input signal is converted into the one or more haptic signals. In other embodiments, one or more portions of an input signal are extracted from the source, and the one or more portions of the input signal are converted into the one or more haptic signals. Further, in certain embodiments, the converting the input into the one or more haptic signals can be performed before a playback of the input. The flow then proceeds to 1230.

At 1230, the one or more haptic signals are encoded. The flow then proceeds to 1240.

At 1240, the one or more haptic signals are stored. In certain embodiments, the one or more haptic signals can be stored within the source, where the one or more haptic signals are combined with the input within a container of the source. In other embodiments, the one or more haptic signals can be stored in a separate file or stream. The flow then proceeds to 1250.

At 1250, the one or more haptic signals are extracted. In embodiments where the one or more haptic signals are stored within the source, the one or more haptic signals can be extracted from the input stored within the source. In embodiments where the one or more haptic signals are stored within a separate file or stream, the one or more haptic signals can be extracted from the separate file or stream. The flow then proceeds to 1260.

At 1260, the one or more haptic signals are decoded. The flow then proceeds to 1270.

At 1270, one or more haptic effects are generated based on the one or more haptic signals. In certain embodiments, the one or more haptic signals can be sent to a haptic output device to generate the one or more haptic effects. In some of these embodiments, the haptic output device is an actuator. Further, in some of these embodiments, the one or more haptic signals can each include a sequence of one or more magnitude values, and a haptic frame rate can be configured that defines a portion of the sequence of one or more magnitude values that are sent to the haptic output device per second. The flow then proceeds to 1280.

At 1280, the one or more haptic effects are synchronized with one or more effects from an associated media. In certain embodiments, the associated media can be the input. In some of these embodiments, embodiments, the one or more effects from the associated media can be one or more effects that are generated either based on the input or with the input. The flow then ends.

Thus, in one embodiment, a system can convert an input signal, such as an audio signal, into a haptic signal "offline." The haptic signal can then be embedded into a multimedia file, where the haptic signal can be combined with audio signals and video signals contained within the multimedia file. The haptic effects generated using the haptic signal can then be synchronized with the audio effects generated using the audio signals and the video effects generated using the video signals. The synchronization of the haptic effects with the audio effects and video effects can provide an additional layer of entertainment for a user of the multimedia file. Thus, the system can provide a quick and easy way for a user to create haptic effects for a multimedia signal contained within a multimedia file. The system can further provide a reliable way to render haptic effects on haptic output devices.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to control conversion of a media signal into a haptic signal, the instructions comprising:
receiving a media signal;
converting the media signal into a haptic signal, wherein the converting includes invoking, by a haptic orchestrator module, at least one module that converts at least a portion of the media signal into the haptic signal;
generating the haptic signal having a sequence of magnitude values that change at a haptic frame rate that is determined according to a frame rate of the media signal, wherein the haptic frame rate of the haptic signal matches the frame rate of the media signal;
encoding the haptic signal;
synchronizing the haptic signal with the media signal according to the matching of the haptic frame rate and the media signal frame rate; and
rendering a haptic effect and the media signal.

2. The non-transitory computer-readable medium of claim 1, wherein an instruction to convert the media signal into the haptic signal is invoked before an instruction to render the media signal at an output device is invoked.

3. The non-transitory computer-readable medium of claim 1, wherein the rendering the haptic effect further includes sending the haptic signal to a haptic output device to generate the haptic effect.

4. The non-transitory computer-readable medium of claim 1, the instructions further comprising configuring the haptic frame rate to define a portion of the sequence of magnitude values that are sent to a haptic output device per second.

5. The non-transitory computer-readable medium of claim 1, wherein the media signal includes one of: an audio signal; a video signal; or a multimedia signal that includes both an audio signal and a video signal.

6. The non-transitory computer-readable medium of claim 1, further comprising instructions for storing the haptic signal such that the haptic signal is combined with the media signal.

7. The non-transitory computer-readable medium of claim 1, further comprising instructions for storing the haptic signal within a file or stream that is separate from the media signal.

8. A device comprising:
a processor; and
a memory storing one or more programs for execution by the processor, the one or more programs including instructions for:
receiving a media signal;
converting the media signal into a haptic signal, wherein the converting includes invoking, by a haptic orchestrator module, at least one module that converts at least a portion of the media signal into the haptic signal;
generating the haptic signal having a sequence of magnitude values that change at a haptic frame rate that is determined according to a frame rate of the media signal, wherein the haptic frame rate of the haptic signal matches the frame rate of the media signal;
encoding the haptic signal;
synchronizing the haptic signal with the media signal according to the matching of the haptic frame rate and the media signal frame rate; and
rendering a haptic effect and the media signal.

9. The device of claim 8, wherein an instruction to convert the media signal into the haptic signal is invoked before an instruction to render the media signal at an output device is invoked.

10. The device of claim 8, wherein the rendering the haptic effect further includes sending the haptic signal to a haptic output device to generate the haptic effect.

11. The device of claim 8, the instructions further comprising configuring the haptic frame rate to define a portion of the sequence of magnitude values that are sent to a haptic output device per second.

12. The device of claim 8, wherein the media signal includes one of: an audio signal; a video signal; or a multimedia signal that includes both an audio signal and a video signal.

13. The device of claim 8, further comprising instructions for storing the haptic signal such that the haptic signal is combined with the media signal.

14. The device of claim 8, further comprising instructions for storing the haptic signal within a file or stream that is separate from the media signal.

15. A method for controlling conversion of a media signal into a haptic signal, the method comprising:

receiving a media signal;

converting the media signal into a haptic signal, wherein the converting includes invoking, by a haptic orchestrator module, at least one module that converts at least a portion of the media signal into the haptic signal;

generating the haptic signal having a sequence of magnitude values that change at a haptic frame rate that is determined according to a frame rate of the media signal, wherein the haptic frame rate of the haptic signal matches the frame rate of the media signal;

encoding the haptic signal;

synchronizing the haptic signal with the media signal according to the matching of the haptic frame rate and the media signal frame rate; and rendering a haptic effect and the media signal.

16. The method of claim 15, wherein an instruction to convert the media signal into the haptic signal is invoked before an instruction to render the media signal at an output device is invoked.

17. The method of claim 15, further comprising instructions for storing the haptic signal such that the haptic signal is combined with the media signal.

18. The method of claim 15, further comprising instructions for storing the haptic signal within a file or stream that is separate from the media signal.

* * * * *